W. D. & J. R. PENNINGTON.
ELECTRICAL GENERATOR.
APPLICATION FILED APR. 12, 1906. RENEWED MAY 7, 1912.
1,301,077.
Patented Apr. 15, 1919.
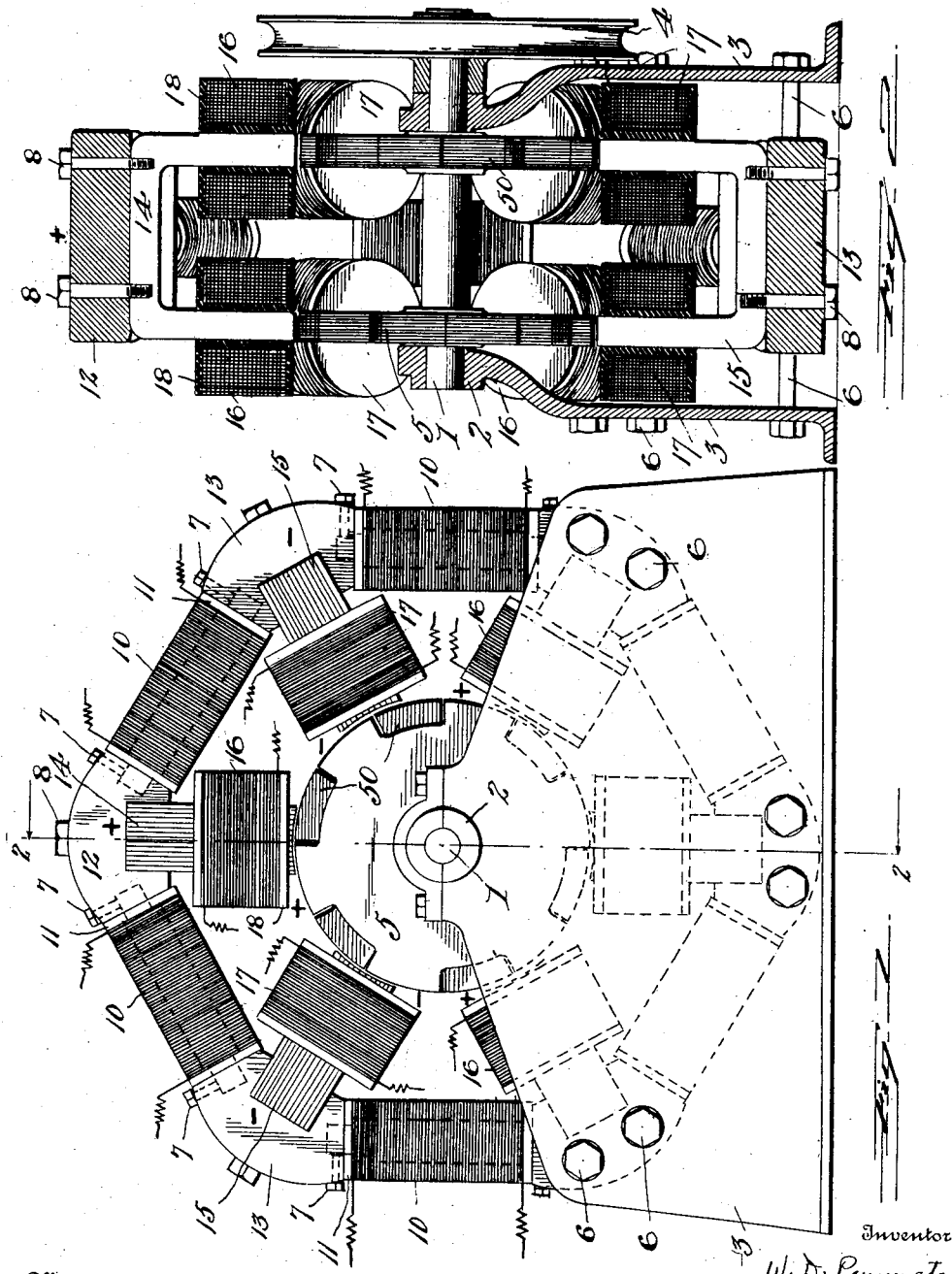

UNITED STATES PATENT OFFICE.

WILLIAM D. PENNINGTON, OF FRENCH LICK, INDIANA, AND JOHN R. PENNINGTON, OF CHICAGO, ILLINOIS.

ELECTRICAL GENERATOR.

1,301,077.  Specification of Letters Patent.  Patented Apr. 15, 1919.

Application filed April 12, 1906, Serial No. 311,385. Renewed May 7, 1912. Serial No. 695,786.

*To all whom it may concern:*

Be it known that we, WILLIAM D. PENNINGTON and JOHN R. PENNINGTON, citizens of the United States, residing, respectively, at French Lick, Orange county, Indiana, and at Chicago, in the county of Cook and State of Illinois, have invented a certain new and useful Improvement in Electrical Generators, of which the following is a full, clear, concise, and exact description, reference being had to the accompanying drawings, forming a part of this specification.

This invention relates to generators for the electric current.

The object of the invention is to produce a machine wherein induced currents of electricity are produced by the passage of an inductor in proximity to the poles of electromagnets arranged in the progression hereinafter stated.

Figure 1 is a side elevation of an electrical generator involving the principles of the invention.

Fig. 2 is a vertical section, on the line 2—2, Fig. 1.

The numeral 1 indicates a driving shaft, borne in bearings 2 on the frame 3, and driven from pulley 4.

The shaft 1 carries two spaced disk-like inductors, 5 and 50. These inductors are preferably built up of soft iron plates, and are secured to shaft 1 so as to rotate therewith.

The inductors 5 and 50 are notched in their peripheries, the notches being preferably of the same width as the teeth between the notches. The notches of one inductor disk alternate with the teeth of the other in transverse direction, that is, in the line of the driving shaft.

Surrounding the inductors there are a number of electro-magnets.

These magnets are of composite construction, as I will now explain.

A coil of insulated wire 10 surrounds a soft iron core 11, and when the electric current passes through said coil 10 the core 11 becomes a magnet. One end of core 11 is naturally the north pole, and the other end the south pole of such magnetized core.

The ends of core 11 are in contact with the holding pieces 12 and 13, which pieces 12 and 13, may be of cast iron. A succession of cores 11 and holding pieces 12 and 13 form a complete ring around the central shaft 1. Such of the holding pieces as are in proximity to the frame 3 may be secured thereto, as by screws 6. The cores may be held to the holders 12 and 13 by set screws 7.

The cores 11 are so alternated that two north poles are in contact with opposite sides of one holder, and two south poles are in contact with the next holder 13. Thus holders 12 and 13 are alternately positive and negative magnetic poles.

Yoke or pole pieces 14 and 15 are secured in slots in the holders 12 and 13, as by screws or bolts 8. These yoke pieces are preferably made up of thin plates of soft iron. Their ends form duplex poles near the inductor.

Around each end of yokes 14 and 15 there are coils 16 and 17 of insulated wire supported on suitable spools 18. As the yoke 14 is a part of pole piece of a composite magnet of which magnet the yoke 15 is the other pole, both the coils on yoke 14 will be of like polarity, while the two coils on yoke 15 will be of reverse polarity. One end of yoke 14 will be opposite a tooth in inductor 5 while the other end will be opposite a notch in inductor 50, and the same will be true as to the yokes 15 with reference to the inductor. The ends of the yokes or pole pieces 14 and 15 are concave, so that the convex ends of the inductor teeth will swing close to the yokes but not touch them, as the inductor rotates.

When the inductor, 5, 50, is rotated, (the coils 10 being then conductors of an electric current) the passage of the inductor teeth past the ends of yokes 14 and 15 brings those inductor teeth into and out of inductive relation with the cores 11, 11. This induces a shifting of the lines of force back and forth in said cores, first to one side and then to the other, referring particularly to Fig. 2. Thus currents are induced in the coils 16 and 17, and an electric current can be taken from each of said coils. Preferably the coils, 16 and 17, are connected in series, but they may be connected in multiple, or in any known manner employed in conducting the electric current.

The coils 10 may be charged from any source of electrical energy. The inductors may be driven by any suitable motor.

Each disk of the duplex inductor moves from a pole piece of one polarity toward one of opposite polarity, and one of the duplex poles of like polarity is in proximity to the inductor tooth while the other is opposite a notch of the inductor. The rotation of the inductor produces exceedingly rapid pulsations, and a large development of electric current.

Of course the same principle may be carried out with a longer shaft, and an increased number of inductors and magnets.

By this arrangement it will be seen that the movable member, in this case a rotary duplex inductor, induces a shifting generating field by acting inductively on both ends of the generating coils, the central portions of which are associated with the poles of the ring magnet.

As the teeth on one side of the inductor come opposite the corresponding pole pieces, a magnetic circuit is established through such teeth and through such pole pieces, and the ring carrying the coils 10, so that currents are induced in the coils on such pole pieces,—that is to say, currents are induced in the coils 16, 17 on one side of the machine. As these teeth recede from these pole pieces and the teeth on the other side of the inductor come opposite the other pole pieces,—that is the pole pieces on the other side of the machine,—magnetic circuits are closed through such other pole pieces and the outside ring thereby inducing currents in the induction coils on these other pole pieces. At the same time, the teeth of the first-mentioned side of the inductor, pass from the corresponding pole pieces, thereby opening the magnetic circuits formed therethrough as first described. Inasmuch as the teeth and the spaces between the same on both sides of the inductor are the same, and inasmuch further as the teeth on the two sides of the inductors are staggered with reference to one another, the teeth on one side of the inductor approach the corresponding pole pieces as the teeth on the other side recede from their pole pieces, and vice versa, so that the flux through the coils 10 remains constant during the operation of the machine. As a result there is no reactance on the energizing coils 10 and no possibility of burn-outs as is possible in other types of generator. Beside that the action of the generator is virtually the action of an alternating current transformer or converter, with the consequent automatic adjustment of current to load upon short circuit.

Changes and modifications can be made without departing from the spirit of the invention.

We claim:

1. In an electrical generator, the combination of a series of primary coils arranged about a center, cores within the coils with like poles connected to a holder, a pole piece secured to each holder and projecting toward the center, a secondary coil about each pole piece, and a rotary inductor moving in proximity to all of said pole pieces.

2. The combination of a series of primary coils, cores for said coils, having their poles alternating, duplex pole pieces in magnetic relation to said cores, said duplex pole pieces being arranged side by side, secondary coils about each of the pole pieces, and a duplex inductor, the two sides of which have alternate teeth and notches, which move in proximity to the pole pieces.

3. The combination of a ring provided with a series of coils forming pole pieces at intervals, a series of cores each associated with one of said pole pieces and each provided with two separated portions projecting inwardly, generating coils around said projections, and a centrally disposed rotary inductor having two sets of teeth, whereof the teeth in each set are staggered.

4. A generator comprising a ring magnet with poles at intervals, each pole being provided with two pole pieces, one on each side of the ring, and a rotary centrally disposed inductor constructed with two members arranged side by side, said members having teeth of the same size and separated by spaces of the same size, the teeth of the two members being staggered with reference to one another thus to maintain the area of the inductor presented to each pair of pole pieces constant.

5. A device of the class specified comprising a series of U-shaped magnets arranged radially in annular order with their legs extending inwardly, and a rotary inductor arranged centrally within said series of magnets and comprising two sets of inductor members arranged in staggered relationship, said inductor members coöperating with the inner ends of said magnets.

6. A device of the class specified comprising a ring shaped member provided at intervals with magnetic coils, U-shaped magnets carried by said member and having their middle portions secured to said member between the coils thereof, and their legs extending radially inward, and a rotary inductor member provided with two sets of projections which said projections coöperate with the inner ends of said U-shaped magnets.

7. A device of the class specified comprising a ring shaped member provided at intervals with magnetic coils, U-shaped electromagnets carried by said member and having their middle portions secured to said member between the coils thereof, and their legs extending radially inward, and a rotary inductor member provided with two sets of projections which said projections coöperate with the inner ends of said U-shaped magnets, the projections of said two sets being staggered with reference to one another.

In witness whereof, we hereunto subscribe our names this 2d day of April A. D., 1906.

WILLIAM D. PENNINGTON.
JOHN R. PENNINGTON.

Witnesses:
  A. MILLER BELFIELD,
  I. C. LEE.

Copies of this patent may be obtained for five cents each, by addressing the "Commissioner of Patents, Washington, D. C."